C. W. GLOVER.
Harvester.
No. 3,055. Reissued July 28, 1868.
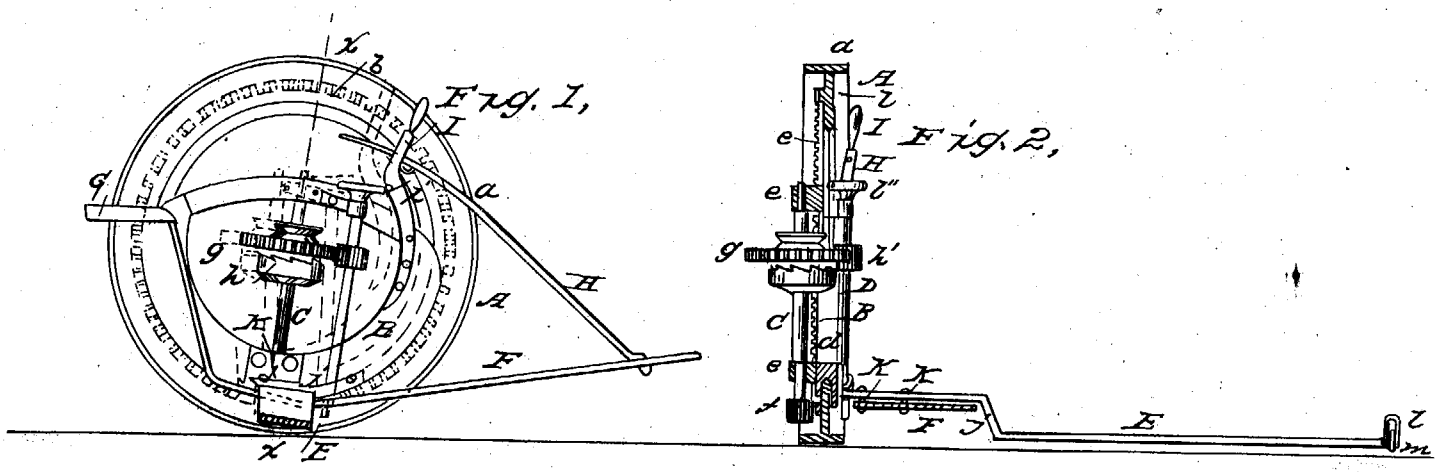
N. PETERS, Photo-Lithographer, Washington, D. C.

UNITED STATES PATENT OFFICE.

JOHN G. PERRY, OF KINGSTON, RHODE ISLAND, ASSIGNEE, BY MESNE ASSIGNMENTS, OF CARLOS W. GLOVER, OF ROXBURY, CONN.

IMPROVEMENT IN HARVESTERS.

Specification forming part of Letters Patent No. 15,882, dated October 14, 1856; Reissue No. 3,055, dated July 28, 1868.

*To all whom it may concern:*

Be it known that CARLOS W. GLOVER, of Roxbury, in the county of Litchfield and State of Connecticut, invented a new and Improved Grain and Grass-Harvester, on which Letters Patent of the United States were granted, bearing date the 14th day of October, 1856; that the said Letters Patent have been assigned to me, JOHN G. PERRY, of Kingston, in the county of Washington and State of Rhode Island; and that the following is a full, clear, and exact description of such invention, reference being had to the accompanying drawings, making a portion of this specification, in which—

Figure 1 is a side view of a harvester constructed according to this invention. Fig. 2 is a vertical section of the same in the plane indicated by the line *x x* in Fig. 1.

Similar letters of reference indicate corresponding parts in both figures.

This invention consists in so constructing and operating a vibrating sickle-driving mechanism of a harvesting-machine that such mechanism shall work through the driving-wheel of such machine, whereby when the sickle-bar is situated nearly or quite in the same vertical plane as the axle of the machine the power may be more directly and consequently be more efficiently communicated to the sickle than when such mechanism is arranged to work outside the periphery of the supporting-wheel.

The invention further consists in certain novel means whereby the principal feature, just mentioned, of the invention may be very effectually carried out and the sickle-bar be adjusted for cutting at different heights.

To enable others to understand the construction and operation of the invention, I will proceed to describe it with reference to the drawings.

A represents the driving-wheel of the machine, which is formed with a broad tread, *a*, having formed centrally upon its inner side a flange, *b*, which on its outer surface, at a short distance from its edge, is furnished with cogs *c*.

B shows what may be termed a "guide-box," consisting of a grooved segment fitted over or upon the edge of the flange *b*, and designed to extend around about three-fifths of the internal circumference of the flange. The groove in this segment should be of V shape, as shown at *d* in Fig. 2, the internal edge of the flange *b*, just mentioned, being of corresponding shape, so that the guide-box may not have unnecessary play or be liable to work loose in consequence of wear.

C is a vertical shaft, which works in bearings *e* on the outer side of the guide-box B. The lower end of this shaft has upon it a pinion, *f*, gearing into the cogs *c* on the flange *b*. The shaft C has furthermore a toothed wheel, *g*, placed loosely upon it, and is enabled to turn with the shaft in one direction by means of a clutch, *h*, attached to such shaft, the wheel *g* remaining stationary when the shaft is turned in the opposite direction, as by the backing of the machine, so that the sickle may not be operated thereby during such backward movement of the machine.

D is a shaft working in bearings on the inner side of the guide-box B, and furnished with a pinion, *h'*, which gears into the toothed wheel *g*, the latter passing through the central space or opening of the driving-wheel, as shown more fully in Fig. 2, and at the upper end of the just-mentioned shaft D is a hand-wheel, *i*.

The finger-bar is represented at E, and has its inner end attached to the lower portion of the guide-box B, such inner end having a curve, *j*, in it, so that it may be somewhat higher than the outer or remaining part of the bar, as shown in Fig. 2.

F is a bar connected by joints K with the higher portion *j'* of the finger-bar E, and near the driving-wheel. This bar F is attached to the finger-bar at right angles thereto, and has attached to its back end the driver's seat G, while the draft-pole of the machine is attached to its forward end.

H is a rod attached at one end to the outer end of the bar F, and having its opposite end passing through a handle, I, attached to the guide-box B. This rod H may be fixed to the handle at any desired point by pins passing therethrough, or by any other suitable means, so that by turning the guide-box B, through the agency of the handle I, the cutting-edges of the sickle, attached to the finger-bar, may be raised or lowered to cut at any desired height from the ground.

Provided at the outer extremity of the finger-bar, and at right angles thereto, is an arm, *l*, which extends back, and has pivoted to its rear end a small wheel or roller, *m*.

As the machine is drawn forward the driving-wheel, by means of its cogs *e*, rotates the pinion *f* of the shaft C, and through the agency of the wheel *g* and pinion *h'* causes the shaft D to revolve to operate the sickle connected in the usual or in any suitable manner therewith. The mechanism working through the driving-wheel, as hereinbefore explained, the power designed to drive the sickle is transmitted thereto through the interior of the driving-wheel, and is thus enabled to act more directly and consequently more efficiently than would be the case if such power were conveyed by mechanism arranged to work past or externally to the circumference of such driving-wheel. Furthermore, the sickle being driven by the shaft D, and the driving device being within the driving-wheel, it is kept free from cut grass or grain.

The cutting-edges of the sickle may be raised or lowered by the driver, when on his seat, while the machine is being drawn forward; and in case the sickle should become clogged, the driver, by turning the hand-wheel *i*, may free the same. It should further be mentioned that the guide-box B should have allowed to it some slight vertical play on the flange *b*, so that the sickle may rise and fall to conform to inequalities in the surface of the ground over which it passses.

What I claim as the invention of CARLOS W. GLOVER, and desire to secure by Letters Patent, is—

1. So constructing and operating the vibrating sickle-driving mechanism of a harvesting machine that such mechanism shall work through the driving-wheel of the machine.

2. The combination of the cogs *e* on the driving-wheel, the pinion *f*, upright shaft C; and wheel *g* with the pinion *h'* of the shaft D, arranged substantially as and for the purpose specified.

3. The combination, with the driving-wheel, of the guide-box B, bar F, rod H, and lever I, in such manner that the angle of presentation of the cutters carried by the finger-bar E may be adjusted substantially as set forth.

JOHN G. PERRY.

Witnesses:
A. LE CLERC,
J. W. COOMBS.